United States Patent [19]

Meier

[11] Patent Number: 4,744,928

[45] Date of Patent: May 17, 1988

[54] REGULAR PACKING FOR COUNTERCURRENT MASS AND DIRECT HEAT TRANSFER COLUMNS

[75] Inventor: Werner Meier, Elgg, Switzerland

[73] Assignee: Sulzer Brothers Limited, Winterthur, Switzerland

[21] Appl. No.: 397,776

[22] Filed: Jul. 13, 1982

[30] Foreign Application Priority Data

Jul. 30, 1981 [CH] Switzerland .................. 4922/81

[51] Int. Cl.[4] .............................. B01F 3/04
[52] U.S. Cl. ........................ 261/95; 165/60; 165/166; 165/170; 261/112; 261/DIG. 72; 366/337; 428/181
[58] Field of Search ........................ 261/94–98, 261/108, 112, 113, DIG. 72; 55/90; 210/150, 521; 202/158; 422/310; D23/3, 4; 29/157.3 D; 428/176, 597, 181–185, 604; 165/166, 170, 60; 366/336, 337, 340

[56] References Cited

U.S. PATENT DOCUMENTS

| | | | |
|---|---|---|---|
| 1,887,704 | 11/1932 | Wilisch | 261/DIG. 72 |
| 2,911,204 | 11/1959 | Malone | 261/DIG. 72 |
| 3,491,892 | 1/1970 | McCann | 210/521 |
| 3,669,425 | 6/1972 | Copeland | 261/112 X |
| 3,871,624 | 3/1975 | Huber et al. | 165/170 X |
| 3,918,688 | 11/1975 | Huber et al. | 366/336 |
| 4,186,159 | 1/1980 | Huber | 261/112 |
| 4,218,408 | 8/1980 | Henning et al. | 261/112 |

FOREIGN PATENT DOCUMENTS

| | | | |
|---|---|---|---|
| 2269998 | 12/1975 | France | 261/112 |
| 1373142 | 11/1974 | United Kingdom | 261/94 |
| 1442969 | 7/1976 | United Kingdom . | |
| 1572665 | 7/1980 | United Kingdom | 261/94 |

Primary Examiner—Richard L. Chiesa
Attorney, Agent, or Firm—Kenyon & Kenyon

[57] ABSTRACT

The regular packing element is formed by layers of inclined deflecting elements. The deflecting elements are arranged in criss-crossing relation to each other and provide continuous flow channels which are open at both ends. In addition, the flow channels are open laterally to the flow channels of the adjacent layers of the deflecting elements. The packing provides for an improved and accelerated mass transfer between two media flowing through the packing in countercurrent.

8 Claims, 2 Drawing Sheets

REGULAR PACKING FOR COUNTERCURRENT MASS AND DIRECT HEAT TRANSFER COLUMNS

This invention relates to a regular packing for a countercurrent mass transfer column.

As is known, various types of packings have been known for use in static mixers, for example as described in U.S. Pat. Nos. 4,062,524 and 4,220,416 and U.S. Pat. No. 4,170,446 (FIG. 4).

Generally, the function of the known packing is to provide a homogeneous mixing of two or more substances which flow in cocurrent relation, that is, to provide a very well mixed end product over the entire flow cross-section for all quantity ratios and all viscosity ratios of the ingredients to be mixed.

The object of the invention, however, is to devise an effective regular packing for countercurrent columns for the use for mass transfer and direct heat transfer processes.

Mass transfers in columns of this type are, of course, associated with diffusion events which occur near the contacting boundary layers of two fluid media, e.g. during rectification between a liquid phase and a gas phase. Unlike statistical or random column packings, regular packings such as those described in German A.S. No. 15 51 419 and Swiss Pat. No. 398,503, have an ordered or regular structure. For example, such regular packings have a structure which consists of contacting corrugated lamellas which are disposed in parallel to the column axis with the corrugations of the adjacent lamellae crossing one another. In addition, the corrugations may have a jagged or wavy shape. During use, the lamellae serve as carrier or support surfaces for the liquid phase which descends by gravity in the form of a film and which is brought into surface contact, for instance, in the case of a rectifying or absorption column, with a gas phase which fills up the gaps in the regular packings in countercurrent to the liquid phase or, in the case of extraction columns with a second liquid phase. The mass transfer thus occurs between the two adjacent lamallae. However, because of the closed surfaces between the adjacent lamellae, the concentration of the phases cannot be equalized over the entire column cross-section. Thus, in order to achieve equalization, at least two regular packings must be placed one above the other at an offset of 90° from one another.

Accordingly, it is an object of the invention to provide a single regular packing in which a mass transfer and an equalization of concentration over the cross-section of a countercurrent column may occur.

It is another object of the invention to provide an effective regular packing for a countercurrent column for use in mass transfer or direct heat exchange processes.

It is another object of the invention to provide a regular packing which can be constructed in a simple manner.

Briefly, the invention provides a regular packing for a countercurrent column. The packing includes a plurality of vertically disposed side-by-side layers of parallel deflecting elements in contiguous contact. The deflecting elements of each layer are arranged at an incline relative to the axis of the column as well as at an incline relative to the deflecting elements of an adjacent layer in criss-crossing relation. As such, the deflecting elements of each layer define parallel flow channels for a descending liquid and an ascending vapor in the case of distillation. Further, the flow channels of each layer are open laterally to the flow channels of an adjacent layer in order to permit a lateral distribution of the descending liquid and the ascending vapor.

The open structure of the regular packing insures a satisfactory distribution over the packing cross-section of the vapor in mass transfer and direct heat exchange, for example in rectification and absorption, and of the liquid in extraction.

The inclination of the deflecting elements also insures very satisfactory lateral mixing of the liquid in a gas/liquid application since the liquid trickles along the deflecting elements.

It has been surprisingly found that the liquid also spreads out over the underside of the deflecting elements. Further, there is a transfer of liquid from one deflecting element to the other at the junctions of the adjacent deflecting elements.

The various structural features of the packing lead to satisfactory radial guidance of the ascending vapor and the descending liquid and, therefore, leads to a maximum use of the propulsive concentration and temperature gradient for mass transfer and heat exchange purposes.

Where the liquid is applied to or removed from the deflecting elements or the trickling film is accelerated or decelerated, the liquid film is disturbed. Those disturbances of the liquid film cause liquid particles to be moved from the core to the surface thereof and vice versa, so as to continuously renew the surface of the liquid film. This mechanical movement is much more rapid than the movement of the liquid molecules by diffusion. Consequently, differences in concentration and temperature are compensated for not just by diffusion alone but also by rapid movement of the liquid particles.

The regular packing thus greatly accelerates and improves mass transfer and heat exchange. Further, these effects can be enhanced by making further modifications in the deflecting element. For example, the deflecting elements may have the surfaces patterned with a texture, for example by having fluted surfaces so as to improve the spreading out of the liquid. Also, the deflecting elements may be provided with apertures. This leads to an enhanced mixing of the descending liquid flows on the top surfaces and bottom surfaces of the deflecting elements. Further, the deflecting elements may be overlapped with each other at the crossing points. This boosts the transfer of liquid from one deflecting element to an adjacent deflecting element.

Further, at least some of the deflecting elements may have jags in the side edges and the ends in order to expedite the transfer of liquid between the adjacent deflecting elements. In this event, when the deflecting elements are fluted, particularly in a herringbone pattern, liquid is transferred not only at the junctions of the deflecting elements but also by dripping from the edges of one element to the surfaces of the deflecting element immediately below. This dripping further increases the exchange area between the liquid and vapor phases while also disturbing the trickling film present on the surfaces impinged on so as to boost the exchange occurring thereat.

The deflecting elements may also have alternating plane surfaces and pattern surfaces as well as stair-like surfaces in order to provide additional acceleration and delay effects for the film of liquid.

BRIEF DESCRIPTION OF THE DRAWINGS

These and other objects and advantages of the invention will become more apparent from the following detailed description taken in conjunction with the accompanying drawings wherein.

DETAILED DESCRIPTION OF THE DRAWINGS

Figure 1:
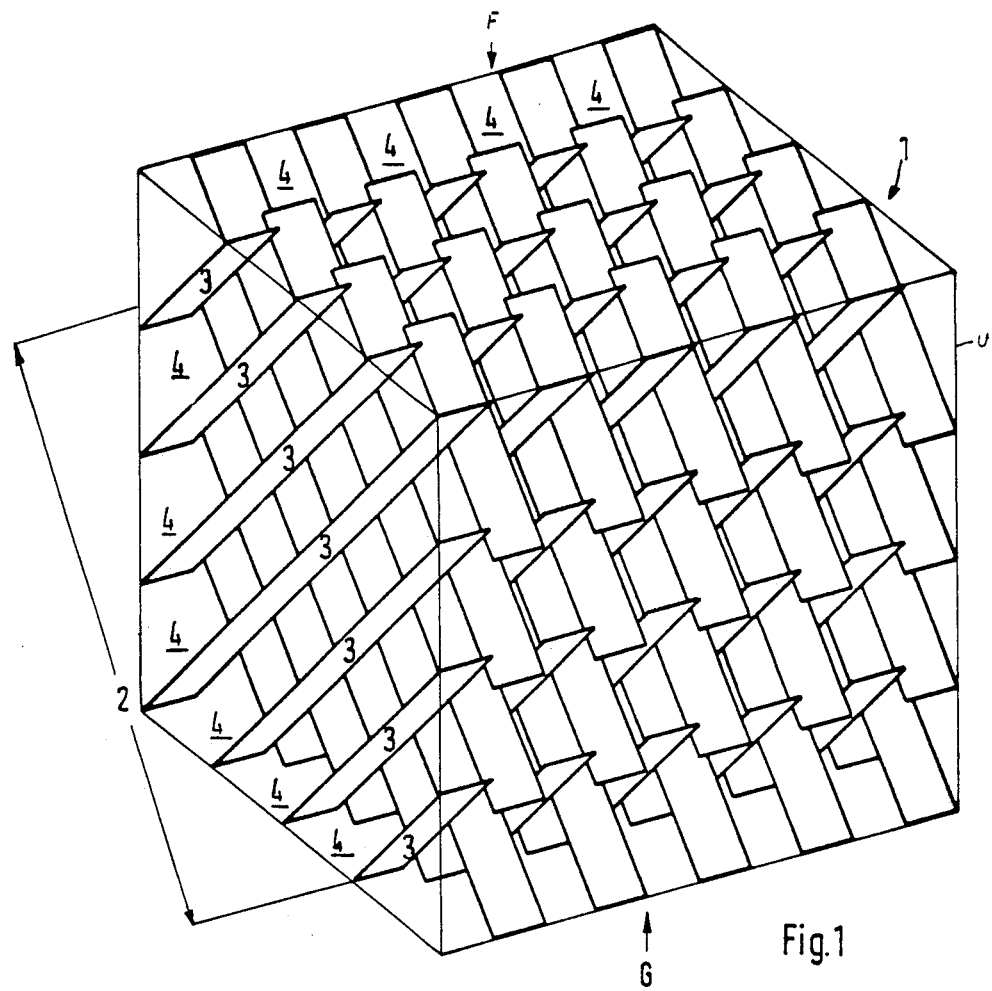
FIG. 1 illustrates a perspective view of a regular packing constructed in accordance with the invention.

Referring to FIG. 1, the regular packing can be used in a mass transfer column, for example, a rectifying column of square cross-section. However, the cross-section can be of other shape, such as circular. Where the column is cylindrical in shape, the edge zones of the packing are adapted to the inside surface of the column.

As shown, the regular packing 1 has a plurality of vertically disposed side-by-side layers 2 of parallel deflecting elements 3. The deflecting elements of each layer 2 are inclined relative to the axis of the column as well as being inclined relative to the deflecting elements 3 of an adjacent layer 2 in criss-crossing relation. In addition, the deflecting elements 3 of each layer 2 contact the deflecting elements 3 of the adjacent layers while defining parallel flow channels 4 which are open at both ends. These channels 4 serve to convey a descending liquid and an ascending vapor. An arrow F denotes the flow direction of the liquid and an arrow G indicates the flow direction of the vapor. The lines U diagrammatically indicate the contour of the packing element 1.

The flow channels 4 of each layer 2 are open laterally to the flow channels 4 of each adjacent layer 2 in order to permit a lateral distribution of the descending liquid and the ascending vapor.

In use, the regular packing 1 is placed within a countercurrent column having a longitudinal vertical axis. In this regard, the packing is adapted to fill the cross-section of the column. In known manner, a liquid is caused to flow downwardly in the direction F while a vapor is caused to flow upwardly in the direction G. During this time, the liquid trickles downwardly over the top and bottom surfaces of each of the deflecting elements 3 while the vapor fills the gaps or flow channels defined by the deflecting elements 3. As a result, a contact occurs between the two phases. In addition, the descending liquid is able to pass laterally from one layer 2 to the elements 3 of an adjacent layer 2. Likewise, the ascending vapor is able to flow laterally between the layers 2. Thus, equalization of the concentration of the phases is obtained over the entire cross-section of the column.

Figure 2:
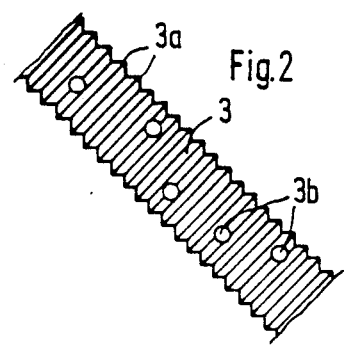
FIG. 2 illustrates a modified version of a deflecting element having fluted surfaces and apertures.

Referring to FIG. 2, each deflecting element 3 may also be provided with a fluted surface 3a, for example in a herringbone pattern. In addition, the elements 3 may be provided with apertures 3b. These features serve to enhance the spreading out of the liquid and the mixing of the descending liquid films on the top and bottom surfaces of the elements 3.

Figure 3:
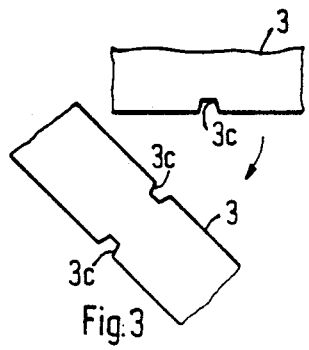
FIG. 3 illustrates an exploded view of a junction between two deflecting elements in accordance with one embodiment of the invention.

Referring to FIG. 3, the adjacent deflecting elements 3 may be provided with groove-like recesses 3c at the crossing point or junctions such that when the elements 3 are pushed together in the direction indicated by the arrow, the elements 3 overlap so as to interfit with each other. This arrangement further facilitates transfer of the descending liquid from one element 3 to the adjacent element 3.

Before the packing is placed in a column, the deflecting elements 3 of the discrete layers 2 can be joined together at their junctions, for example, by welding.

Figure 4:
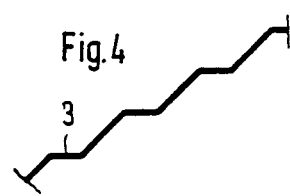
FIG. 4 illustrates a side view of a deflecting element having stair-like surfaces.

Referring to FIG. 4, each element 3 may be formed with stair-like surfaces in order to provide additional acceleration and delay effects for the descending films of liquid.

Figure 5:
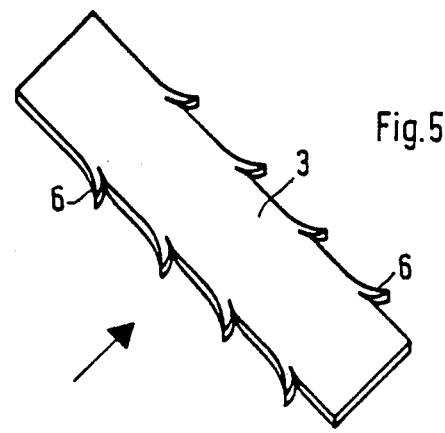
FIG. 5 illustrates a perspective view of a deflecting element have jags in the side edges.
Figure 6:
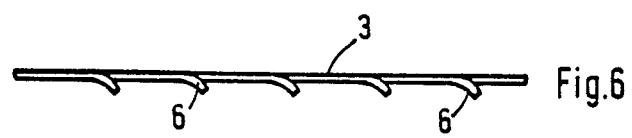
FIG. 6 illustrates a side view of the deflecting element of FIG. 5 taken in the direction of the arrow indicated in FIG. 5.

Referring to FIGS. 5 and 6, each deflecting element 3 may have jags 6 provided along the longitudinal side edges. These jags 6 serve to expedite transfer of liquid between the adjacent deflecting elements 3.

Figure 7:
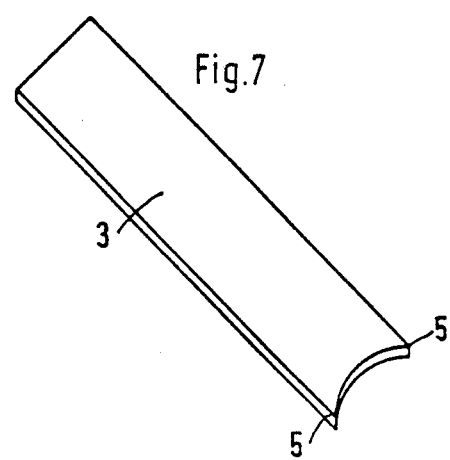
FIG. 7 illustrates a deflecting element having a jag in an end thereof.

Finally, referring to FIG. 7, each deflecting element 3 may be provided with jags 5 at the lower end to provide for a dripping action of the liquid from one element onto a lower element.

It is to be noted that in columns of considerable diameter, for example of one meter or more, the packing 1 can comprise a number of parts which are joined together in the column in order to form one complete packing element.

The invention thus provides a regular packing which provides for a lateral distribution of a descending first fluid and an ascending second fluid within the packing per se in order to even out differences in concentration, temperature and the like across the cross-section of the packing.

What is claimed is:

1. In combination with a countercurrent column for mass and direct heat exchange having a longitudinal vertical axis;
a regular packing of open construction in said column having a plurality of vertically disposed side-by-side layers of parallel deflecting elements in continuous contact, said deflecting elements of each layer being inclined relative to said axis and being inclined relative to said elements of an adjacent layer in criss-crossing relation, said deflecting elements of each layer defining parallel flow channels for a descending first fluid and an ascending second fluid, said flow channels of each layer being open laterally to said flow channels of each adjacent layer to permit a lateral distribution of the descending first fluid and ascending second fluid.

2. The combination of claim 1 wherein at least some of said deflecting elements have a fluted surface.

3. The combination of claim 1 wherein at least some of said deflecting elements have apertures therein.

4. The combination of claim 1 wherein at least some of said deflecting elements have alternating plane surfaces and patterned surfaces.

5. The combination of claim 1 wherein at least some of said deflecting elements have stair-like surfaces.

6. The combination of claim 1 wherein said deflecting elements overlap with each other at crossing points thereof to interfit with each other.

7. The combination of claim 1 wherein at least some of said deflecting elements have jags in at least one of a side edge and/or an end thereof to provide for a dripping action of liquid from one element onto a lower element.

8. The combination of claim 1 wherein each said deflecting element is of elongated rectangular shape.

* * * * *

UNITED STATES PATENT AND TRADEMARK OFFICE
CERTIFICATE OF CORRECTION

PATENT NO. : 4,744,928

DATED : May 17, 1988

INVENTOR(S) : WERNER MEIER

It is certified that error appears in the above-identified patent and that said Letters Patent is hereby corrected as shown below:

Column 4, lines 46 to 47 change "continuous" to -contiguous-

Signed and Sealed this

Twenty-ninth Day of November, 1988

*Attest:*

DONALD J. QUIGG

*Attesting Officer*  *Commissioner of Patents and Trademarks*